United States Patent
Kirschner

(10) Patent No.: US 11,479,140 B2
(45) Date of Patent: Oct. 25, 2022

(54) CALIBRATION OF A CHARGING DEVICE OF AN ELECTRIC VEHICLE

(71) Applicant: AUDI AG, Ingolstadt (DE)

(72) Inventor: Sebastian Kirschner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/031,629

(22) Filed: Sep. 24, 2020

(65) Prior Publication Data

US 2021/0086645 A1   Mar. 25, 2021

(30) Foreign Application Priority Data

Sep. 25, 2019  (DE) .......................... 102019125736.0

(51) Int. Cl.
*B60L 53/60* (2019.01)
*H02J 7/00* (2006.01)
*B60L 53/30* (2019.01)
*B60L 53/16* (2019.01)

(52) U.S. Cl.
CPC ............... *B60L 53/60* (2019.02); *B60L 53/16* (2019.02); *B60L 53/30* (2019.02); *H02J 7/0042* (2013.01)

(58) Field of Classification Search
CPC .......... B60L 53/60; B60L 53/16; B60L 53/30; H02J 7/0042
USPC ......................................................... 320/109
See application file for complete search history.

(56) References Cited

U.S. PATENT DOCUMENTS

| | | | | |
|---|---|---|---|---|
| 10,131,235 | B2 * | 11/2018 | Weidinger | H02J 7/04 |
| 2011/0288704 | A1 * | 11/2011 | Schwarz | H01M 10/615 |
| | | | | 701/22 |
| 2013/0335024 | A1 * | 12/2013 | Akai | B60L 3/0069 |
| | | | | 320/109 |
| 2014/0039735 | A1 * | 2/2014 | Major | H02J 7/007 |
| | | | | 701/22 |
| 2016/0059719 | A1 * | 3/2016 | Jung | B60L 3/00 |
| | | | | 320/109 |
| 2016/0059733 | A1 * | 3/2016 | Hettrich | H04W 4/029 |
| | | | | 701/2 |
| 2017/0028862 | A1 * | 2/2017 | Nagel | B60L 53/18 |
| 2017/0259956 | A1 * | 9/2017 | Hori | F25B 21/04 |
| 2017/0267116 | A1 * | 9/2017 | Lindemann | B60L 3/12 |
| 2017/0361722 | A1 * | 12/2017 | Köhler | H05K 7/20872 |
| 2018/0236884 | A1 * | 8/2018 | Grienitz | B60L 53/16 |
| 2019/0135124 | A1 * | 5/2019 | Farber | B60L 53/11 |
| 2019/0341661 | A1 * | 11/2019 | Guerra | B60L 53/37 |
| 2020/0070668 | A1 * | 3/2020 | Schreiber | B60L 58/26 |
| 2020/0083701 | A1 * | 3/2020 | Myer | G01K 13/00 |
| 2020/0185928 | A1 * | 6/2020 | Ha | B60L 58/12 |
| 2020/0290468 | A1 * | 9/2020 | Moseke | B60L 53/16 |
| 2020/0317069 | A1 * | 10/2020 | Akai | H01M 10/46 |
| 2020/0406770 | A1 * | 12/2020 | Ruppert | H02J 7/0042 |
| 2021/0252988 | A1 * | 8/2021 | Metzger | B60L 53/14 |
| 2021/0265852 | A1 * | 8/2021 | Albrecht | H02J 7/00711 |

FOREIGN PATENT DOCUMENTS

| | | |
|---|---|---|
| DE | 10 2004 056 434 A1 | 5/2006 |
| DE | 10 2016 206 487 A1 | 10/2017 |
| DE | 10 2016 218 303 A1 | 3/2018 |

* cited by examiner

*Primary Examiner* — Suchin Parihar
(74) *Attorney, Agent, or Firm* — Seed Intellectual Property Law Group LLP

(57) ABSTRACT

A calibration device for a charging device of an electric vehicle and a method for calibrating a charging device of an electric vehicle are described.

9 Claims, 2 Drawing Sheets

CALIBRATION OF A CHARGING DEVICE OF AN ELECTRIC VEHICLE

TECHNICAL FIELD

Embodiments of the invention relate to a calibration device for a charging device of an electric vehicle. Embodiments of the invention further relate to a method for calibrating a charging device of an electric vehicle.

DESCRIPTION OF THE RELATED ART

Every electric vehicle includes a traction battery that provides electrical power for operating an electric powertrain and other electrical consumers in the electric vehicle. For charging the traction battery, the electric vehicle further includes a charging device, connected to the traction battery, which allows the electric vehicle to be connected to an external charging station.

The charging device comprises a charger (OBC, on-board charging) and a charging socket, which is operatively connected to the charger and which has a temperature sensor, into which a charging plug of the external charging station can be plugged. The temperature sensor usually takes the form of an NTC or thermistor. The charger includes a high-voltage unit, connected to the traction battery, which is connected to the charging socket, and an evaluation unit, which is connected to the temperature sensor of the charging socket and the high-voltage unit. The charging device further comprises a bus interface for connecting the charger—in particular, the evaluation unit—to a bus system of the electric vehicle.

During charging of the traction battery, a strong electric current can flow through the plug-in connection formed by the charging plug and the charging socket, which current generates a heat loss at ohmic resistors of the charging plug and/or of the charging socket. The heat loss generated leads to a heating, i.e., an increase in the temperature, of the charging socket. Particularly in the case of worn contact elements of the charging plug and/or of the charging socket, the ohmic resistance of the plug connection can be increased, and, consequently, the heat loss generated can be increased, which leads to an overheating, i.e., a strong increase in the temperature, of the charging socket. The charging socket can be damaged by overheating.

To prevent overheating, the temperature sensor of the charging socket continuously detects the temperature of the charging socket during charging and transmits sensor signals corresponding to measured temperature values to the evaluation unit, which compares the transmitted temperature values with one or more predetermined temperature threshold values stored in the evaluation unit and reduces the charging current or interrupts charging if the transmitted temperature value exceeds a corresponding temperature threshold value.

DE 10 2016 218 303 A1 accordingly discloses a method for assessing a quality of a charging plug of a charging device for electric vehicles. In this method, a charging device of an electric vehicle compares a temperature of a charging socket of the charging device detected by a temperature sensor of the charging device during charging with a stored value of a reference temperature. The stored value is measured during charging of the electric vehicle by means of an ideal reference charging plug, i.e., a reference charging plug of optimum quality. If the quality of the charging plug is inadequate, i.e., the reference temperature is unacceptably exceeded during charging, the charging current will be reduced or charging interrupted.

However, any reduction or interruption of the charging current does, however, reduce a charging efficiency of the electric vehicle, because the charging process takes more time. When the temperature sensor signals excessively high temperature values, the charging efficiency will be unnecessarily reduced. When, on the other hand, the temperature sensor signals excessively low temperature values, the service life of the charging socket will be reduced. For an optimal charging efficiency and long service life of the charging socket, the temperature sensor of the evaluation unit must therefore reliably signal temperature values as accurately as possible. In other words, the temperature sensor must always be calibrated. However, a calibration of the temperature sensor may be lost during utilization of the electric vehicle over time by aging and/or by wear-and-tear processes.

The method disclosed by DE 10 2004 056 434 A1 serves, in general, to gauge a temperature sensor of a vehicle, i.e., to check a calibration of the temperature sensor. After an actual journey of the vehicle, the temperature sensor is gauged during a rest phase by acquiring different temperature profiles, such as a temperature profile of the ambient temperature, of the cooling water, of the engine oil, or of the fuel, depending upon the temperature sensor being gauged. The temperature profiles acquired are compared with corresponding characteristic curves from a respectively associated computational model in order to determine an impending or already present defect, i.e., a lack of calibration, of the temperature sensor.

Going further, DE 10 2016 206 487 A1 discloses a method for calibrating one or more temperature sensors of a vehicle. Temperature values measured by the temperature sensors are compared with a temperature value provided by a meteorological service. By a comparison of the measured temperature values with the temperature value provided, and, optionally, amongst themselves, the temperature sensors can be calibrated even taking into account special environmental conditions—for example, in a parking lot with no shade or in a garage.

However, this calibration method is not suitable for calibrating a charging device, i.e., a temperature sensor of a charging device, of an electric vehicle.

There is, accordingly, a need for devices and methods for detecting and/or, if necessary, recalibrating a non-calibrated (no longer calibrated) or defective charging device of an electric vehicle prior to start-up of the electric vehicle and during a service life of the electric vehicle.

BRIEF SUMMARY

The present disclosure provides a calibration device for calibrating a charging device of an electric vehicle, which device allows a calibration of the charging device over the entire service life of the electric vehicle. Furthermore, the present disclosure also provides a method for calibrating a charging device of an electric vehicle that can be carried out over the entire service life of the electric vehicle.

According to embodiments of the invention, the calibration device comprises a plug for plugging into a charging socket of a charging device of an electric vehicle, and a calibration plate, held on the plug and, in the plug-in state of the calibration device, thermally acting on the calibration plate, having a temperature control unit held on the calibration plate and thermally connected to the calibration plate, and a control unit operatively connected to the temperature control unit, and is configured to set a temperature of the calibration plate to a predetermined temperature. In other words, the plug is designed like a charging plug of a charging station, resulting in simple manageability and usability of the calibration unit at any time, and requiring no installation work on the electric vehicle.

The plug is provided with a temperature-controllable calibration plate which extends perpendicular to a plug-in direction of the plug and can have a rectangular shape. The calibration plate may be connected to the plug in a thermally-conductive manner. In this case, heat can be applied to the charging socket via the plug. Alternatively or additionally, the calibration plate can be in thermally-conductive contact with the charging socket in the plugged-in state of the calibration unit. In this case, heat can be applied directly to the charging socket.

The charging socket is essentially heated by the calibration plate to the predetermined temperature, which is detected by a temperature sensor of the charging socket. A temperature value measured at the predetermined temperature by the temperature sensor is fundamental for detecting a lack of calibration and a possibly required calibration of the charging device.

In some embodiments, the calibration device is configured to automatically adjust the temperature of the calibration plate to a plurality of predetermined different temperatures, one after the other. The several predetermined different temperatures may be distributed in a temperature range relevant to the charging device and allow calibration over the entire relevant temperature range. In this way, even a temperature-dependent deviation from the calibration over a temperature range can be detected and taken into account in the calibration.

Advantageously, the calibration device comprises at least one temperature sensor which is operatively connected to the control unit and designed and arranged for detecting a temperature of the charging socket. For example, the temperature sensor can be arranged on a side of the calibration plate facing the charging socket in the plugged-in state of the calibration device.

In further embodiments, the temperature sensor is designed as an optical sensor. Optical sensors are designed to detect a temperature in a contactless manner. They therefore allow temperature to be measured at a distance.

In other embodiments, the temperature control unit takes the form of an electrothermal transducer. For example, the temperature control unit can comprise a Peltier element thermally connected to the calibration plate.

Advantageously, the calibration device further comprises an interface, connected to the control unit, for connecting the control unit to a diagnostic interface (OBD, on-board diagnosis) of the electric vehicle. The interface enables data to be exchanged with the electric vehicle. In addition, the interface of the calibration device can enable the use of electrical energy provided by the electric vehicle. In these cases, the calibration device does not require its own electric power source.

In these embodiments, the control unit can furthermore be configured to assign or compare a temperature value of the charging socket received via the interface by or from the electric vehicle to a temperature value of the charging socket measured by the at least one temperature sensor. With others, the control unit of the calibration device can establish a pair relationship between simultaneously received and measured temperature values, i.e., combine the temperature values into a pair.

The control unit may be configured to transmit a pair of mutually associated temperature values to the electric vehicle via the interface and the diagnostic interface. The transmitted pair of temperature values can be stored in the control unit and forms a calibration of the charging device of the electric vehicle. If several different temperatures are set by the calibration device, the control unit can transmit to the electric vehicle a corresponding plurality of pairs, i.e., a calibration table, which then form the calibration of the charging device.

Ideally, the control unit is configured to calculate a difference between mutually associated temperature values and to perform an action dependent upon the calculated difference. On the basis of the calculated difference, the control unit can distinguish two or more cases and treat these cases differently.

In some embodiments, the action comprises displaying a calibrated state of the charging device when a value of the calculated difference is less than a predetermined first tolerance value, and displaying an incalibratability of the charging device when the value of the calculated difference is greater than a larger predetermined second tolerance value different from the first tolerance value. This corresponds to determining whether the charging device is to be regarded as in order or as defective.

In some embodiments, the action comprises displaying a calibratability of the charging device and/or transmitting mutually associated, received and detected temperature values to the electric vehicle via the interface and the diagnostic interface if the value of the calculated difference lies between the first tolerance value and the second tolerance value. This corresponds to the detection and/or calibration of a calibratable charging device.

Embodiments of the invention also relate to a method for calibrating a charging device of an electric vehicle. The method ensures a high charging efficiency of the electric vehicle and, simultaneously, a long service life of the charging socket.

In some embodiments, a plug of a calibration device is plugged into a charging socket of a charging device of an electric vehicle, and the calibration device sets a temperature of a calibration plate of the calibration device held on the plug and thermally acting on the charging socket to a predetermined temperature. In short, the calibration device is connected to the charging socket of the charging device essentially like a charging plug of a charging station, which goes hand in hand with a handling that is particularly simple and at all times possible.

In some embodiments, the methods described herein are carried out with a calibration device as described herein. The calibration devices described herein are designed and particularly suitable for carrying out the methods described herein.

A significant advantage of the devices described herein is that, by means of the device, charging problems occurring during the service life of the electric vehicle can be detected, analyzed, and corrected in a simple manner. Accordingly, components of the charging device do not need to be exchanged on the basis of suspicion in order to always ensure high charging efficiency in the case of a long service life of the electric vehicle. This goes hand in hand with a high level of satisfaction on the part of a user of the electric vehicle.

DETAILED DESCRIPTION

Figure 1:
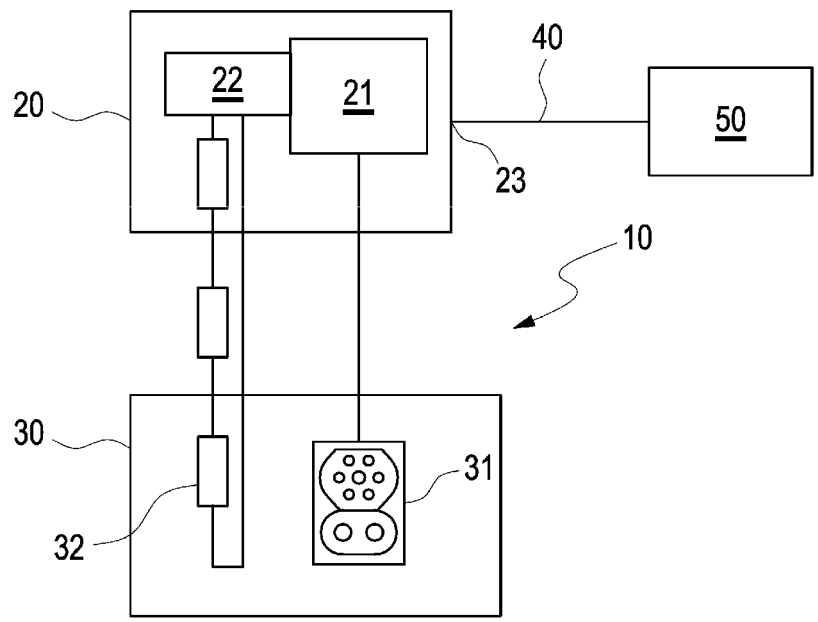
FIG. 1 illustrates a block diagram of a charging device of an electric vehicle according to the prior art.

FIG. 1 shows, in a schematic representation, a block diagram of a charging device 10 of an electric vehicle according to the prior art. The charging device 10 comprises a charger (OBC, on-board charging) 20, a charging socket unit 30, which comprises a charging socket 31, operatively connected to the charger 20, into which a charging plug of an external charging station (not shown) can be plugged, and a temperature sensor 32 associated with the charging socket 31. The temperature sensor 32 takes the form of an NTC or thermistor.

The charger 20 further includes a high-voltage unit 21, connected to a traction battery of the electric vehicle and connected to the charging socket 31, and an evaluation unit 22 which is operatively connected to the temperature sensor 32 of the charging socket 31 and of the high-voltage unit 21. The charging device 10 further comprises a bus interface 23 for connecting the charger 20—in particular, the evaluation unit 22—to a bus system 40 of the electric vehicle. The bus system also includes a gateway 50.

Figure 2:
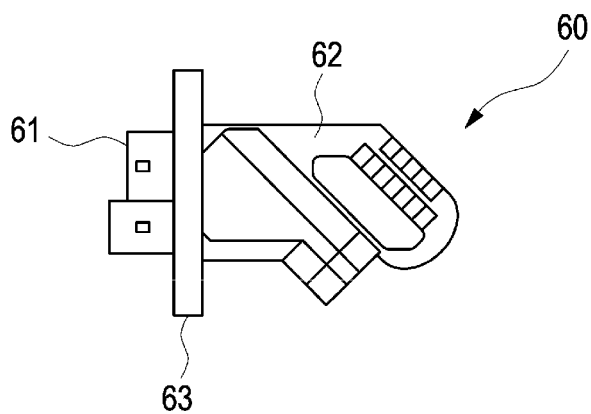
FIG. 2 illustrates a side view of a calibration device for the charging device shown in FIG. 1.

FIG. 2 shows, in a schematic representation, a side view of a calibration device 60 according to an embodiment for the charging device 10 shown in FIG. 1. The calibration device 60 is suitable for calibrating the charging device 10 of the electric vehicle and comprises a plug 61 for plugging into the charging socket 31 of the charging device 10 of an electric vehicle. The calibration device 60 further comprises a calibration plate 63 which is held on the plug 61 and acts thermally on the charging socket 31 in the plugged-in state of the calibration device 60.

The calibration plate 63 has a rectangular shape and extends transversely to an insertion direction of the plug 61, but is not limited to this shape and direction of extension. The calibration device further comprises a handle 62 which is arranged opposite the plug 61.

Figure 3:
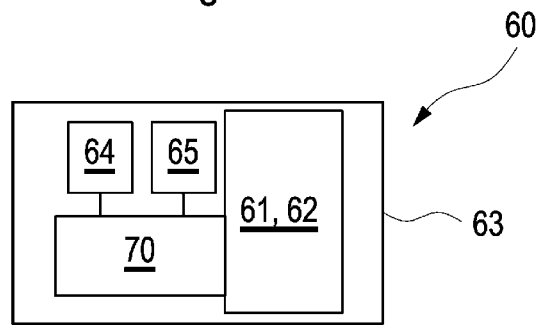
FIG. 3 illustrates a front view of the calibration device shown in FIG. 2.

FIG. 3 shows, in a schematic representation, a front view of the calibration device 60 shown in FIG. 2. The calibration plate 63 further comprises a temperature control unit 64, held on the calibration plate 63 and thermally connected to the calibration plate 63, and a control unit 70 operatively connected to the temperature control unit 64, and is configured to set a temperature of the calibration plate 63 automatically, one after the other, to a plurality of predetermined temperatures distributed in a temperature range relevant to the charging socket 31. The temperature control unit 64 is designed as an electrothermal converter in the form of a Peltier element, but is not limited to this design.

Furthermore, the calibration device 60 comprises one or more temperature sensors 65, operatively connected to the control unit 70, which are designed to detect a temperature of the charging socket 31 and are arranged on the calibration plate 63. The temperature sensor 65 takes the form of an optical sensor.

Figure 4:
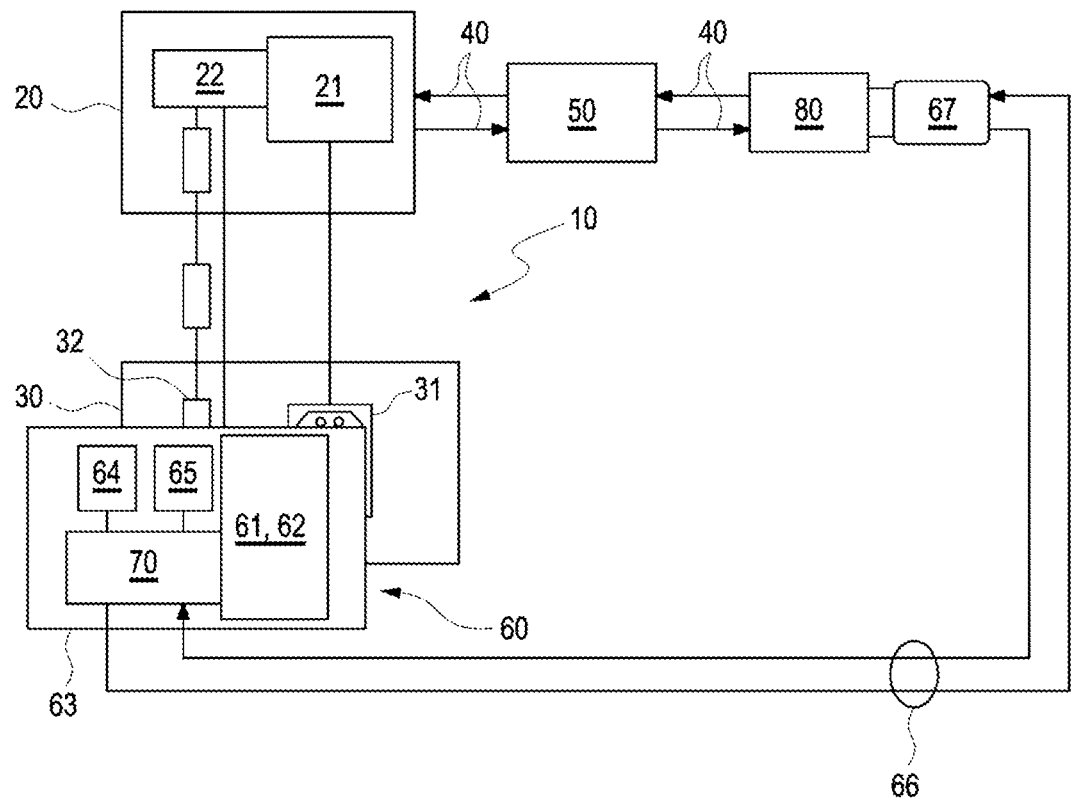
FIG. 4 illustrates a block diagram of the charging device shown in FIG. 1 and of the calibration device shown in FIGS. 2 and 3 in a plugged-in state.

FIG. 4 shows, in a schematic representation, a block diagram of the charging device 10 shown in FIG. 1 and of the calibration device 60 shown in FIGS. 2 and 3 in a plugged-in state. The calibration device 60 further comprises an interface 66, connected to the control unit 70, for connecting the control unit 70 to a diagnostic interface (on-board diagnosis, OBD) 80, connected to the gateway 50 via the vehicle bus 40, of the electric vehicle. The interface 66 is embodied as a private bus and comprises a diagnostic plug 67 which is plugged into a diagnostic socket of the diagnostic interface 80, whereby the control unit 70 is connected to the bus system 40 of the electric vehicle, and a bi-directional data exchange between the control unit 70 and the evaluation unit 22 is made possible.

Figure 5:
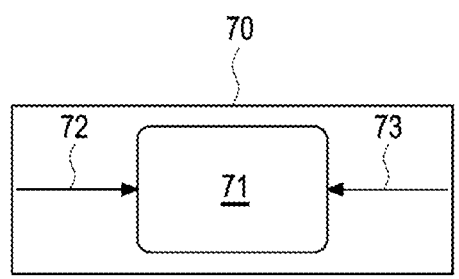
FIG. 5 illustrates an enlarged detail view of the control unit shown in FIG. 4.

FIG. 5 shows, in a schematic representation, an enlarged detailed view of the control unit 70 shown in FIG. 4. The control unit 70 is configured to assign or compare a temperature value 72 of the charging socket 31 received by or from the electric vehicle via the interface 66 to a temperature value 73 of the charging socket 31 measured by the at least one temperature sensor 65.

Furthermore, the control unit 70 is configured to calculate a difference between mutually associated temperature values 72, 73 and to perform an action dependent upon the calculated difference by means of a decision module 71 contained in the control unit 70.

The action includes displaying a calibrated state of the charging device 10, when a value of the calculated difference is less than a predetermined first tolerance value. The action includes displaying an incalibratability of the charging device 10 when the value of the calculated difference is greater than a larger predetermined second tolerance value different from the first tolerance value.

Alternatively, the action includes displaying a calibratability of the charging device 10 and transmitting to the electric vehicle mutually associated, received and detected temperature values 72, 73 via the interface 66 and the diagnostic interface 80 if the value of the calculated difference lies between the first tolerance value and the second tolerance value.

The control unit 70 is also configured to transmit calibration data to the electric vehicle. For this purpose, the control unit 70 forms at each predetermined temperature a pair of mutually associated temperature values 72, 73 i.e., a calibration table, and transmits each pair, i.e., the calibration table, via the interface 66 and the diagnostic interface 80, to the evaluation unit 22 in order to complete the calibration of the charging device 10.

To perform a calibration of the charging device 10 of the electric vehicle, the plug 61 of the calibration device 60 is plugged into the charging socket 31 of the charging device 10. The calibration device 60 then automatically sets a temperature of the calibration plate 63 to the plurality of predetermined temperatures, one after the other. The temperature sensor 32 of the charging socket unit 30 and the temperature sensor 65 of the calibration device 60 in each case measure temperature control values 72, 73 assigned to the predetermined temperatures.

The control unit 70 of the calibration device 60 receives in each case the temperature values 72 measured by the temperature sensor 32 of the charging socket unit 30, assigns these to the temperature values 73 measured by the temperature sensor 65 of the calibration device 60, and compares the received temperature values 72 to the temperature values 73 measured by the temperature sensor 65 of the calibration device 60. To this end, the control unit 70 calculates differences in the temperature values 72, 73 of each pair of temperature values 72, 73 and performs an action dependent upon the calculated difference.

The control unit 70 displays a calibrated state of the charging device 10 when a value of the calculated difference is less than a predetermined first tolerance value, or displays an incalibratability of the charging device 10 when the value of the calculated difference is greater than a larger predetermined second tolerance value different from the first tolerance value.

Alternatively, the control unit 70 indicates a calibratability of the charging device 10 and transmits the mutually associated, received and detected temperature values 72, 73 via the interface 66 and the diagnostic interface 80 to the evaluation unit 22 of the charger 20 of the charging device 10 if the value of the calculated difference lies between the first tolerance value and the second tolerance value. The calibration of the charging device 10 is thus completed.

German patent application no. 10 2019 125 736.0, filed Sep. 25, 2019, to which this application claims priority, is hereby incorporated herein by reference, in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A calibration device for a charging device of an electric vehicle, comprising:
   a plug for plugging into a charging socket of the charging device;
   a calibration plate held on the plug, wherein, in a plugged-in state of the calibration device, the calibration plate acts thermally on the charging socket;
   a temperature control unit held on the calibration plate and thermally connected to the calibration plate, wherein the temperature control unit includes an electrothermal converter;
   a control unit operatively connected to the temperature control unit and configured to set a temperature of the calibration plate to a predetermined temperature; and
   an interface connected to the control unit that communicatively couples the control unit to a diagnostic interface of the electric vehicle.

2. The calibration device according to claim 1, wherein the calibration device is configured to automatically set the temperature of the calibration plate to a plurality of predetermined temperatures one after the other.

3. The calibration device according to claim 1, further comprising at least one temperature sensor operatively connected to the control unit and designed and arranged to detect a temperature of the charging socket.

4. The calibration device according to claim 1, wherein the control unit is configured to compare a temperature value of the charging socket received from the electric vehicle via the interface to a temperature value of the charging socket measured by at least one temperature sensor of the calibration device, and wherein the control unit is configured to transmit a pair of mutually associated temperature values to the electric vehicle via the interface and the diagnostic interface.

5. The calibration device according to claim 1, wherein the control unit is configured to calculate a difference between mutually associated temperature values and to perform an action dependent upon the calculated difference.

6. The calibration device according to claim 5, wherein the action comprises displaying a calibrated state of the charging device when a value of the calculated difference is less than a predetermined first tolerance value, and wherein the action comprises displaying an incalibratability of the charging device when the value of the calculated difference is greater than a predetermined second tolerance value larger than the first tolerance value.

7. The calibration device according to claim 6, wherein the action comprises displaying a calibratability of the charging device and transmitting mutually associated received and detected temperature values to the electric vehicle via the interface and the diagnostic interface when the value of the calculated difference lies between the first tolerance value and the second tolerance value.

8. The calibration device according to claim 1, wherein the electrothermal converter is a Peltier element.

9. A method for calibrating a charging device of an electric vehicle, comprising:
   plugging a plug of a calibration device into a charging socket of the charging device;
   operating the calibration device to set a temperature of a calibration plate of the calibration device held on the plug and thermally acting on the charging socket to a predetermined temperature; and
   comparing a temperature value of the charging socket received from the electric vehicle to a temperature value of the charging socket measured by at least one temperature sensor of the calibration device.

* * * * *